(12) United States Patent
Tsuchiya et al.

(10) Patent No.: US 12,734,890 B2
(45) Date of Patent: Sep. 15, 2026

(54) VEHICLE-MOUNTED CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Junji Tsuchiya, Osaka (JP); Takafumi Kawakami, Osaka (JP); Seiji Takahashi, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 251 days.

(21) Appl. No.: 18/556,114

(22) PCT Filed: Apr. 21, 2022

(86) PCT No.: PCT/JP2022/018419
§ 371 (c)(1),
(2) Date: Sep. 23, 2024

(87) PCT Pub. No.: WO2022/225010
PCT Pub. Date: Oct. 27, 2022

(65) Prior Publication Data

US 2025/0018797 A1 Jan. 16, 2025

(30) Foreign Application Priority Data

Apr. 21, 2021 (JP) ................................ 2021-072051

(51) Int. Cl.
*H02J 7/50* (2026.01)
*B60L 3/00* (2019.01)
(Continued)

(52) U.S. Cl.
CPC ............ *B60L 3/0023* (2013.01); *B60L 53/18* (2019.02); *H02H 3/08* (2013.01); *H02J 7/865* (2026.01)

(58) Field of Classification Search
CPC ...... B60L 3/0023; B60L 53/18; B60L 3/0046; H02H 3/08; H02H 3/093; H02H 7/00;
(Continued)

(56) References Cited

U.S. PATENT DOCUMENTS

2015/0091377 A1* 4/2015 Namou .................... B60L 1/00 307/10.1
2019/0296541 A1* 9/2019 Mensch ................... B60L 3/04
(Continued)

FOREIGN PATENT DOCUMENTS

JP 2011-042215 A 3/2011
JP 2013-223369 A 10/2013
(Continued)

OTHER PUBLICATIONS

International Search Report, Application No. PCT/JP2022/018419, mailed Jun. 21, 2022. ISA/Japan Patent Office.

*Primary Examiner* — Rexford N Barnie
*Assistant Examiner* — Joshua James Sweet
(74) *Attorney, Agent, or Firm* — Brooks Kushman P.C.

(57) ABSTRACT

A vehicle-mounted control device includes a control unit that switches an interruption unit from an allowable state to an interruption state when an interruption condition is satisfied, and a setting unit that sets the interruption condition. The setting unit sets the interruption condition based on which operation of a first operation and a second operation is in execution. The first operation is an operation of transferring power between a power storage unit and a first transfer unit (connection unit) when a first switch is in an on state, and the second operation is an operation of transferring
(Continued)

power between the power storage unit and a second transfer unit (first load) when a second switch is in an on state.

10 Claims, 7 Drawing Sheets

(51) Int. Cl.

| | |
|---|---|
| ***B60L 53/18*** | (2019.01) |
| ***H02H 3/08*** | (2006.01) |
| ***H02J 7/00*** | (2026.01) |
| ***H02J 7/96*** | (2026.01) |
| ***H02M 7/483*** | (2007.01) |

(58) Field of Classification Search
CPC .. H02H 7/18; H02J 7/0068; H02J 7/00; B60R 16/02
USPC .......................................................... 307/9.1
See application file for complete search history.

(56) References Cited

U.S. PATENT DOCUMENTS

| | | | | |
|---|---|---|---|---|
| 2020/0139818 | A1* | 5/2020 | Fujiwara | B60L 3/003 |
| 2020/0185936 | A1* | 6/2020 | Oishi | H02J 7/575 |
| 2022/0227256 | A1* | 7/2022 | Yu | B60L 58/19 |
| 2023/0327596 | A1* | 10/2023 | Nishimura | H02M 7/53871 |
| 2024/0348081 | A1* | 10/2024 | Zhu | H02J 7/02 |

FOREIGN PATENT DOCUMENTS

| | | |
|---|---|---|
| JP | 2018-067977 A | 4/2018 |
| JP | 2019-047569 A | 3/2019 |
| JP | 2019-097357 A | 6/2019 |
| JP | 2020-072620 A | 5/2020 |

* cited by examiner

VEHICLE-MOUNTED CONTROL DEVICE

CROSS-REFERENCE TO RELATED APPLICATIONS

This application is the U.S. national stage of PCT/JP2022/018419 filed on Apr. 21, 2022, which claims priority of Japanese Patent Application No. JP 2021-072051 filed on Apr. 21, 2021, the contents of which are incorporated herein.

TECHNICAL FIELD

The present disclosure relates to a vehicle-mounted control device.

BACKGROUND

JP 2018-67977 A discloses a power supply device mounted on a vehicle. This power supply device includes a battery, an electric load, and a fuse. The fuse is disposed between the battery and the electric load and functions as an overcurrent protective element.

JP 2019-97357 A discloses an overcurrent protective device provided between a power supply and a load circuit. The load circuit includes an electric load and an electric wire electrically connected to each other. The overcurrent protective device estimates a thermal characteristic of the electric wire based on a load current, and interrupts a switching element based on the estimated thermal characteristic and the load current.

In a configuration having a plurality of transfer units that transfer power with a power storage unit, there is a case where it is desired to switch an interruption condition depending on which of the transfer units the power storage unit is transferring power with. However, an attempt to provide an interruption unit for each path corresponding to each transfer unit using the technology of JP 2018-67977 A or JP 2019-97357 A lead to an increase in the number of components.

Therefore, an object of the present disclosure is to provide a technique capable of suitably executing overcurrent protection in a configuration having a plurality of transfer units that transfer power with a power storage unit, while suppressing an increase in the number of components.

SUMMARY

A vehicle-mounted control device according to the present disclosure is a vehicle-mounted control device used in a vehicle-mounted system including: a power storage unit; a plurality of transfer units that transfer power with the power storage unit; a common path provided between the power storage unit and the plurality of transfer units; a first branch path provided between a first transfer unit of the plurality of transfer units and the common path and electrically connected to the common path; a second branch path provided between a second transfer unit of the plurality of transfer units and the common path and electrically connected to the common path; a first switch provided in the first branch path; a second switch provided in the second branch path; and an interruption unit configured to switch from an allowable state which allows a flow of a current in the common path to an interruption state which interrupts a flow of a current in the common path. The vehicle-mounted control device includes a control unit that switches the interruption unit from the allowable state to the interruption state when an interruption condition is satisfied; and a setting unit that sets the interruption condition, in which the setting unit sets the interruption condition based on which operation of a first operation and a second operation is in execution. The first operation is an operation of transferring power between the power storage unit and the first transfer unit when the first switch is in an on state, and the second operation is an operation of transferring power between the power storage unit and the second transfer unit when the second switch is in an on state.

Advantageous Effects

According to the present disclosure, it is possible to suitably execute overcurrent protection in a configuration having a plurality of transfer units that transfer power with a power storage unit, while suppressing an increase in the number of components.

DETAILED DESCRIPTION OF PREFERRED EMBODIMENTS

Figure 1:
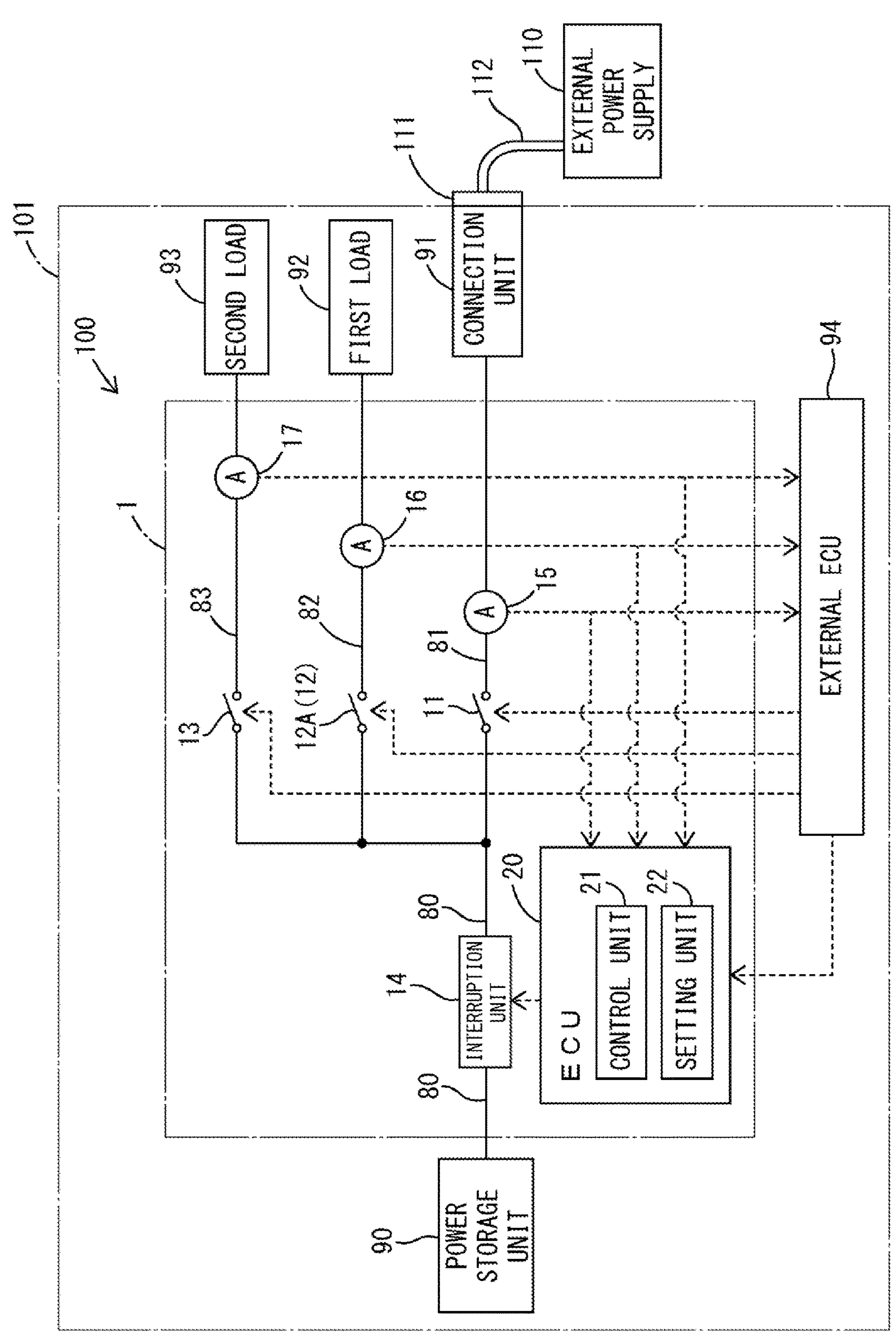
FIG. 1 is a circuit diagram schematically illustrating a configuration of a vehicle-mounted system according to a first embodiment.

Hereinafter, embodiments of the present disclosure will be listed and exemplified.

In a first aspect, a vehicle-mounted control device used in a vehicle-mounted system includes a power storage unit; a plurality of transfer units that transfer power with the power storage unit; a common path provided between the power storage unit and the plurality of transfer units; a first branch path provided between a first transfer unit of the plurality of transfer units and the common path and electrically connected to the common path; a second branch path provided between a second transfer unit of the plurality of transfer units and the common path and electrically connected to the common path; a first switch provided in the first branch path; a second switch provided in the second branch path; and an interruption unit configured to switch from an allowable state which allows a flow of a current in the common path to an interruption state which interrupts a flow of a current in the common path. The vehicle-mounted control device includes a control unit that switches the interruption unit from the allowable state to the interruption state when an interruption condition is satisfied; and a setting unit that sets the interruption condition, in which the setting unit sets the interruption condition based on which operation of a first operation and a second operation is in execution. The first operation is an operation of transferring power between the power storage unit and the first transfer unit when the first switch is in an on state, and the second operation is an operation of transferring power between the power storage unit and the second transfer unit when the second switch is in an on state.

The vehicle-mounted control device can interrupt the flow of current in the common path provided between the power storage unit and the plurality of transfer units by switching the interruption unit to an interruption state when an interruption condition is satisfied. Moreover, the vehicle-mounted control device can set the interruption condition based on which operation of the first operation and the second operation is in execution. That is, without providing a corresponding interruption unit for each transfer unit, it is possible to switch the interruption condition according to which transfer unit the power storage unit is transferring the power with. Therefore, it is possible to suitably execute overcurrent protection in a configuration having a plurality of transfer units that transfer power with a power storage unit, while suppressing an increase in the number of components.

In a second aspect, the vehicle-mounted control device according to the first aspect, in which the setting unit determines which of the first operation and the second operation is in execution based on whether the first switch and the second switch are in an on state or an off state.

According to this configuration, it is possible to simplify determination as to which operation of the first operation and the second operation is in execution.

In a third aspect, vehicle-mounted control device according to the first or the second aspect, in which the setting unit sets a first interruption condition included in the interruption condition when determining that the first operation is in execution, and sets a second interruption condition included in the interruption condition when determining that the second operation is in execution, the first interruption condition is a condition for switching the interruption unit to the interruption state before the first switch is switched to an off state when a current value of a current flowing through the first branch path exceeds a first threshold current, and the second interruption condition is a condition for switching the interruption unit to the interruption state before the second switch is switched to the off state when a current value of a current flowing through the second branch path exceeds a second threshold current which is different from the first threshold current.

According to this configuration, during execution of the first operation, the interruption unit can be switched to the interruption state before the first switch when the current value of the current through the first branch path exceeds the first threshold current. Also, during execution of the second operation, the interruption unit can be switched to the interruption state before the second switch when the current value of the current flowing through the second branch path exceeds the second threshold current.

In a fourth aspect, the vehicle-mounted control device according to the third aspect, in which the first switch is switched to an off state based on a first switch interruption characteristic, the second switch is switched to an off state based on a second switch interruption characteristic, whether the first interruption condition is satisfied or not is determined based on a first interruption characteristic, whether the second interruption condition is satisfied or not is determined based on a second interruption characteristic, the first switch interruption characteristic, the second switch interruption characteristic, the first interruption characteristic, and the second interruption characteristic are each defined by correspondence relationship data indicating a correspondence relationship between an energization time and a current value, to the energization time of the first interruption characteristic, a time longer than that of the first switch interruption characteristic corresponds for a current value equal to or less than the first threshold current, and a time shorter than that of the first switch interruption characteristic corresponds for a current value exceeding the first threshold current, and to the energization time of the second interruption characteristic, a time longer than that of the second switch interruption characteristic corresponds for a current value equal to or less than the second threshold current, and a time shorter than that of the second switch interruption characteristic corresponds for a current value exceeding the second threshold current.

According to this configuration, during execution of the first operation, when the current value of the current flowing through the common path exceeds the first threshold current the interruption unit can be switched to the interruption state before the first switch based on the energization time. Also, during execution of the second operation, when the current value flowing through the common path exceeds the second threshold current, the interruption unit can be switched to the interruption state before the second switch based on the energization time.

In a fifth aspect the vehicle-mounted control device according to any of the first through the fourth aspects, in which the first transfer unit is a connection unit connected to an external power supply via a charging cable, the second transfer unit is a load, the common path is a discharging path from the power storage unit and also is a charging path to the power storage unit, the first branch path is a path for guiding, to the common path, power supplied via the connection unit, the second branch path is a path for guiding, to the load, power from the common path, and the setting unit sets the interruption condition based on which operation of a charging operation and a discharging operation is in execution. The charging operation is an operation of causing a charging current supplied via the connection unit to flow to the power storage unit when the first switch is in an on state, and the discharging operation is an operation of causing a discharging current to flow from the power storage unit to the load when the second switch is in an on state.

According to this configuration, overcurrent protection can be suitably executed based on whether the charging operation is in execution or the discharging operation is in execution.

In a sixth aspect, the vehicle-mounted control device according to the fifth aspect, in which the second threshold current is larger than the first threshold current.

According to this configuration, it is also possible to allow a discharging operation in which a large current flows as compared with in the charging operation.

In a seventh aspect, the vehicle-mounted control device according to the sixth aspect, in which the vehicle-mounted system includes a third branch path provided between a third transfer unit of the plurality of transfer units and the common path and electrically connected to the common path, and a third switch provided in the third branch path, the third transfer unit is a second load, when the third switch is in an on state, a second discharging operation of causing a discharging current to flow from the power storage unit to the second load is performed, the setting unit sets a third interruption condition included in the interruption condition when determining that the second discharging operation is in execution, the third interruption condition is a condition for switching the interruption unit to the interruption state before the third switch is switched to an off state when a current value flowing through the third branch path exceeds a third threshold current, and the third threshold current is different from the second threshold current.

According to this configuration, the interruption condition of the interruption unit can be made different not only depending on whether the charging operation is in execution or the discharging operation is in execution, but also depending on whether the discharging operation is in execution or the second discharging operation is in execution.

In an eighth aspect, the vehicle-mounted control device according to the sixth or the seventh aspects, in which the setting unit outputs an abnormality signal when determining that both the charging operation and the discharging operation are in execution.

According to this configuration, in a configuration where it is not assumed that both the charging operation and the discharging operation are operated concurrently, it is possible to inform the outside about an abnormality that both the charging operation and the discharging operation are in execution.

In a ninth aspect, the vehicle-mounted control device according to any of the first through the eighth aspects, in which the vehicle-mounted system includes a specific load that is different from the transfer unit and receives power from the power storage unit, and a specific branch path that is provided between the specific load and the common path and is electrically connected to the common path, and the vehicle-mounted control device further includes a temperature fuse that is provided in the specific branch path and configured to be fused when exceeding a fusing temperature.

According to this configuration, when a ground fault occurs in the specific load, it is easy to prevent the influence of the ground fault from reaching the power storage unit and the transfer unit.

First Embodiment

A vehicle-mounted system 100 illustrated in FIG. 1 is a system mounted on a vehicle 101, and includes a power storage unit 90, a connection unit 91, a first load 92, a second load 93, an external ECU 94, a common path 80, a first branch path 81, a second branch path 82, a third branch path 83, and a vehicle-mounted control device 1.

The power storage unit 90 is a battery such as a lithium ion battery.

The connection unit 91 corresponds to an example of a first transfer unit. The connection unit 91 is, for example, a charging inlet, and is exposed to the outside of the vehicle 101 when the lid of the DC charging port is opened. A charging plug 111 is connected to the connection unit 91. Thereby, the connection unit 91 is connected to an external power supply 110 via a charging cable 112, and power is supplied from the external power supply 110. The connection unit 91 can supply the power supplied from the external power supply 110 to the power storage unit 90 via the first branch path 81 and the common path 80.

The first load 92 corresponds to an example of a second transfer unit. The first load 92 is, for example, a motor. The motor is, for example, a traveling motor in a case where the vehicle 101 is an electric car or a hybrid car. The first load 92 receives power based on the power storage unit 90 via the common path 80 and the second branch path 82.

The second load 93 corresponds to an example of a third transfer unit. The second load 93 is, for example, a high-pressure auxiliary machine, more specifically, an air conditioner, a heater, or the like. The second load 93 receives power based on the power storage unit 90 via the common path 80 and the third branch path 83.

The common path 80 is provided between the power storage unit 90 and the plurality of transfer units (in the present embodiment, the connection unit 91, the first load 92, and the second load 93). The common path 80 is a discharging path from the power storage unit 90 and also is a charging path to the power storage unit 90. The common path 80 is electrically connected to the power storage unit 90.

The first branch path 81 is provided between the power storage unit 90 and the connection unit 91, and is electrically connected to the common path 80. The first branch path 81 is a path for guiding, to the common path 80, power supplied from the connection unit 91 (i.e., the external power supply 110). When the power storage unit 90 is to be charged, the external power supply 110 is connected to the connection unit 91.

The second branch path 82 is provided between the power storage unit 90 and the first load 92, and is electrically connected to the common path 80. The second branch path 82 is a path for guiding, to the first load 92, power from the common path 80.

Third branch path 83 is provided between the power storage unit 90 and the second load 93, and is electrically connected to the common path 80. The third branch path 83 is a path for guiding, to the second load 93, power from the common path 80.

The vehicle-mounted control device 1 is a device mounted on the vehicle 101 and used in the vehicle-mounted system 100. The vehicle-mounted control device 1 includes a first switch 11, a second switch 12, a third switch 13, an interruption unit 14, current detection units 15, 16, and 17, and an ECU 20.

The first switch 11, the second switch 12, and the third switch 13 are mechanical switches in the present embodiment, but may be semiconductor switches such as FETs. The first switch 11 is provided in the first branch path 81. The second switch 12 is provided in the second branch path 82. The third switch 13 is provided in the third branch path 83. The first switch 11, the second switch 12, and the third switch 13 are each controlled by the external ECU 94.

The interruption unit 14 is provided in the common path 80. The interruption unit 14 has a function of switching from an energization state which energizes the common path 80 to an interruption state which interrupts the common path. The interruption unit 14 is a semiconductor switch such as an FET in the present embodiment, but may be a mechanical switch. The interruption unit 14 becomes the energization state in an on state, and becomes the interruption state in an off state. Alternatively, the interruption unit 14 may be a breaker that physically cuts the path by being given a control signal. More specifically, the interruption unit 14 may be a pyrotechnic breaker (e.g., a pyrofuse (PYROFUSE®)) that causes an explosion when a driving current is input, and physically cuts the path by moving a displacement portion by this explosion. The interruption unit 14 is controlled by the ECU 20.

The current detection units 15, 16, and 17 are, for example, known current detection circuits. The current detection unit 15 detects the current value of the current flowing through the first branch path 81. The current detection unit 15 includes, for example, a shunt resistor provided in the first branch path 81 and a differential amplifier circuit that amplifies and outputs a voltage between both ends of the shunt resistor. The current detection unit 16 detects the current value of the current flowing through the second branch path 82. The current detection unit 16 includes, for example, a shunt resistor provided in the second branch path 82 and a differential amplifier circuit that amplifies and outputs a voltage between both ends of the shunt resistor. The current detection unit 17 detects the current value of the current flowing through the third branch path 83. The current detection unit 17 includes, for example, a shunt resistor provided in the third branch path 83 and a differential amplifier circuit that amplifies and outputs a voltage between both ends of the shunt resistor. Detection values of the current detection units 15, 16, and 17 are each input to the ECU 20 and the external ECU 94.

The ECU 20 includes a control unit 21 and a setting unit 22. The control unit 21 switches the interruption unit 14 from the allowable state to the interruption state when the interruption condition is satisfied. The setting unit 22 sets the interruption condition. The setting unit 22 can set the interruption condition based on which operation of the charging operation and the first discharging operation is in execution. The charging operation is an operation of causing a charging current based on power from the connection unit 91 (i.e., the external power supply 110) to flow to the power storage unit 90 when the first switch 11 is in the on state. The first discharging operation is an operation of causing a discharging current to flow from the power storage unit 90 to the first load 92 when the second switch 12 is in the on state.

The charging operation and the first discharging operation are executed as follows. The interruption unit 14 is normally in the allowable state, and is switched to the interruption state when an overcurrent occurs. That is, the charging operation is executed when the external power supply 110 is electrically connected to the first branch path 81 via the connection unit 91 and also the first switch 11 is switched to the on state. The first discharging operation is an operation of causing a discharging current to flow from the power storage unit 90 to the first load 92 when the second switch 12 is in the on state. The first discharging operation is executed when the second switch 12 is switched to the on state.

The setting unit 22 can set the interruption condition based on which operation of the first discharging operation and the second discharging operation is in execution. The second discharging operation is an operation of causing a discharging current to flow from the power storage unit 90 to the second load 93 when the third switch 13 is in the on state. The second discharging operation is executed when the third switch 13 is switched to the on state.

The setting unit 22 determines which operation of the charging operation, the first discharging operation, and the second discharging operation is in execution based on whether the first switch 11, the second switch 12, and the third switch 13 are in the on state or in the off state. The setting unit 22 can determine whether the first switch 11, the second switch 12, and the third switch 13 are in the on state or in the off state by receiving, from the external ECU 94, a signal indicating whether the first switch 11, the second switch 12, and the third switch 13 are in the on state or in the off state. The setting unit 22 determines that the charging operation is in execution when determining that the first switch 11 is in the on state, determines that the first discharging operation is in execution when determining that the second switch 12 is in the on state, and determines that the second discharging operation is in execution when determining that the third switch 13 is in the on state.

The interruption condition includes the first interruption condition, the second interruption condition, and the third interruption condition. The setting unit 22 sets the first interruption condition when determining that the charging operation is in execution. The first interruption condition is a condition for switching the interruption unit 14 to the interruption state before the first switch 11 when the current value of the current flowing through the first branch path 81 exceeds the first threshold current. The setting unit 22 sets the second interruption condition when determining that the first discharging operation is in execution. The second interruption condition is a condition for switching the interruption unit 14 to the interruption state before the second switch 12 when the current value of the current flowing through the second branch path 82 exceeds the second threshold current. The setting unit 22 sets the third interruption condition when determining that the second discharging operation is in execution. The third interruption condition is a condition for switching the interruption unit 14 to the interruption state before the third switch 13 when the current value flowing through the third branch path 83 exceeds the third threshold current. The second threshold current is larger than the first threshold current. The second threshold current and the third threshold current are different from each other. The third threshold current may be smaller or may be larger than the first threshold current.

Whether the first interruption condition is satisfied or not is determined based on the first interruption characteristic. More specifically, whether the first interruption condition is satisfied or not is determined based on the first interruption characteristic and the current value of the current flowing through the first branch path 81. Whether the second interruption condition is satisfied or not is determined based on the second interruption characteristic. More specifically, whether the second interruption condition is satisfied or not is determined based on the second interruption characteristic and the current value of the current flowing through the second branch path 82. Whether the third interruption condition is satisfied or not is determined based on the third interruption characteristic. More specifically, whether the third interruption condition is satisfied or not is determined based on the third interruption characteristic and the current value of the current flowing through the third branch path 83.

The first switch 11 is switched to the off state based on the first switch interruption characteristic. More specifically, the first switch 11 is switched to the off state based on the first switch interruption characteristic and the current value of the current flowing through the first branch path 81. The second switch 12 is switched to the off state based on the second switch interruption characteristic. More specifically, the second switch 12 is switched to the off state based on the second switch interruption characteristic and the current value of the current flowing through the second branch path 82. The third switch 13 is switched to the off state based on the third switch interruption characteristic. More specifically, the third switch 13 is switched to the off state based on the third switch interruption characteristic and the current value of the current flowing through the third branch path 83.

Figure 2:
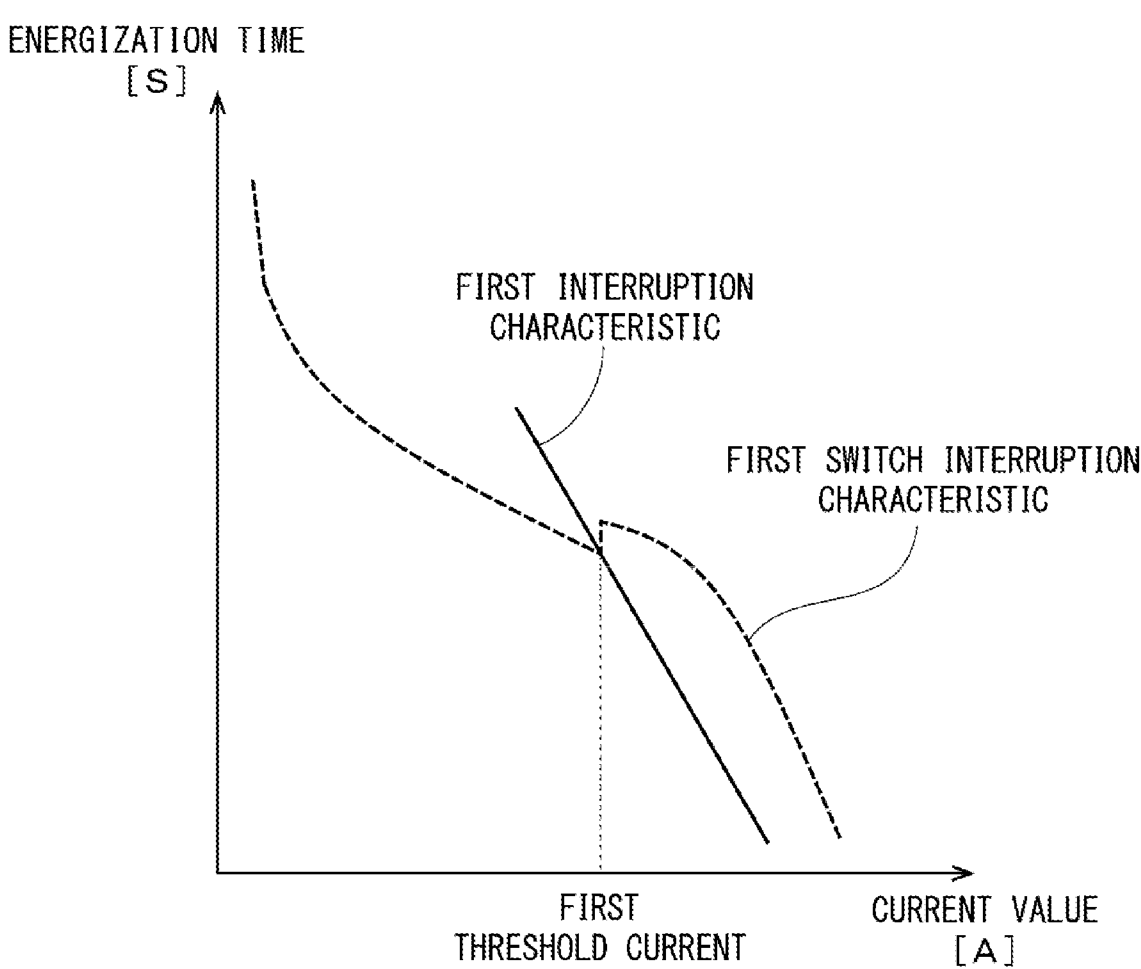
FIG. 2 is a graph illustrating a relationship between a first interruption characteristic and a first switch interruption characteristic.
Figure 3:
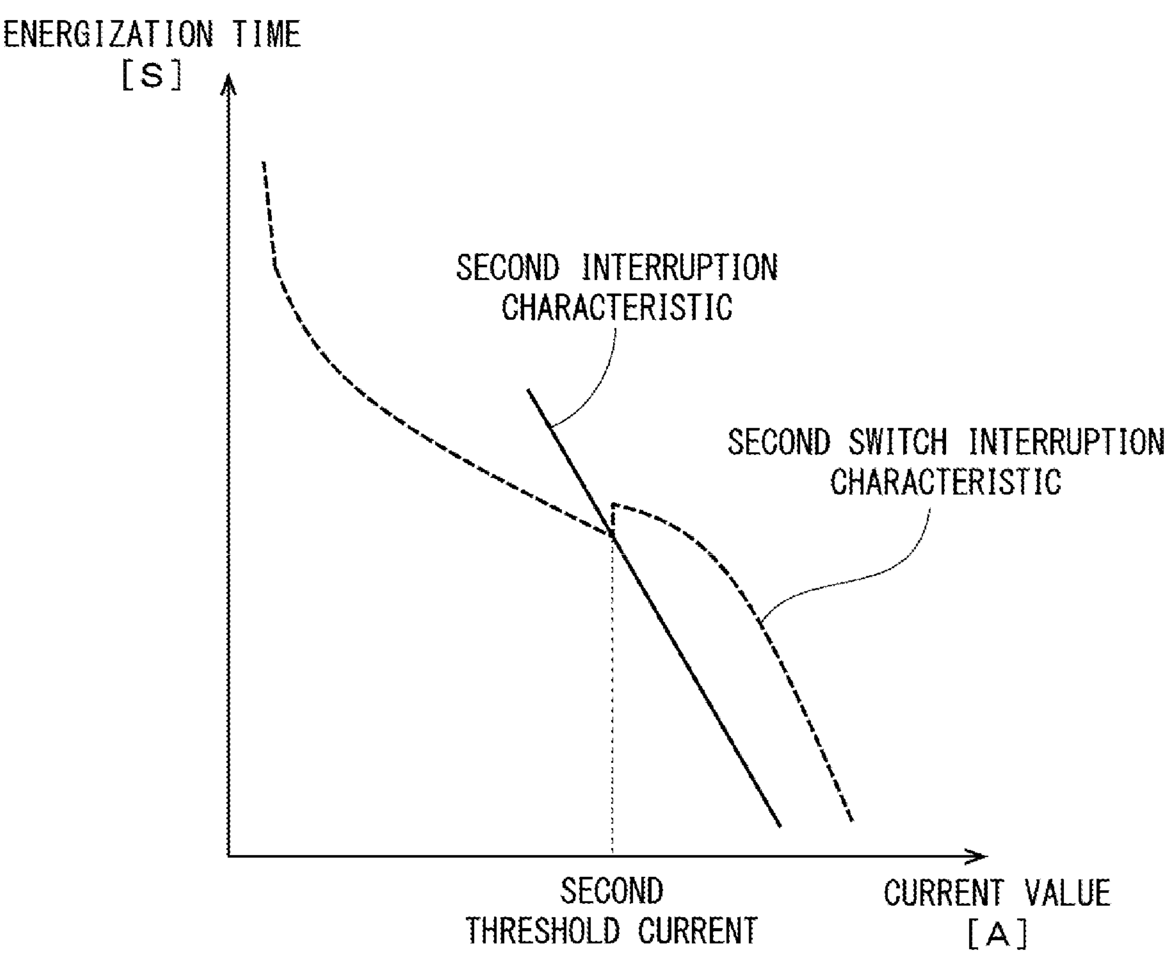
FIG. 3 is a graph illustrating a relationship between a second interruption characteristic and a second switch interruption characteristic.
Figure 4:
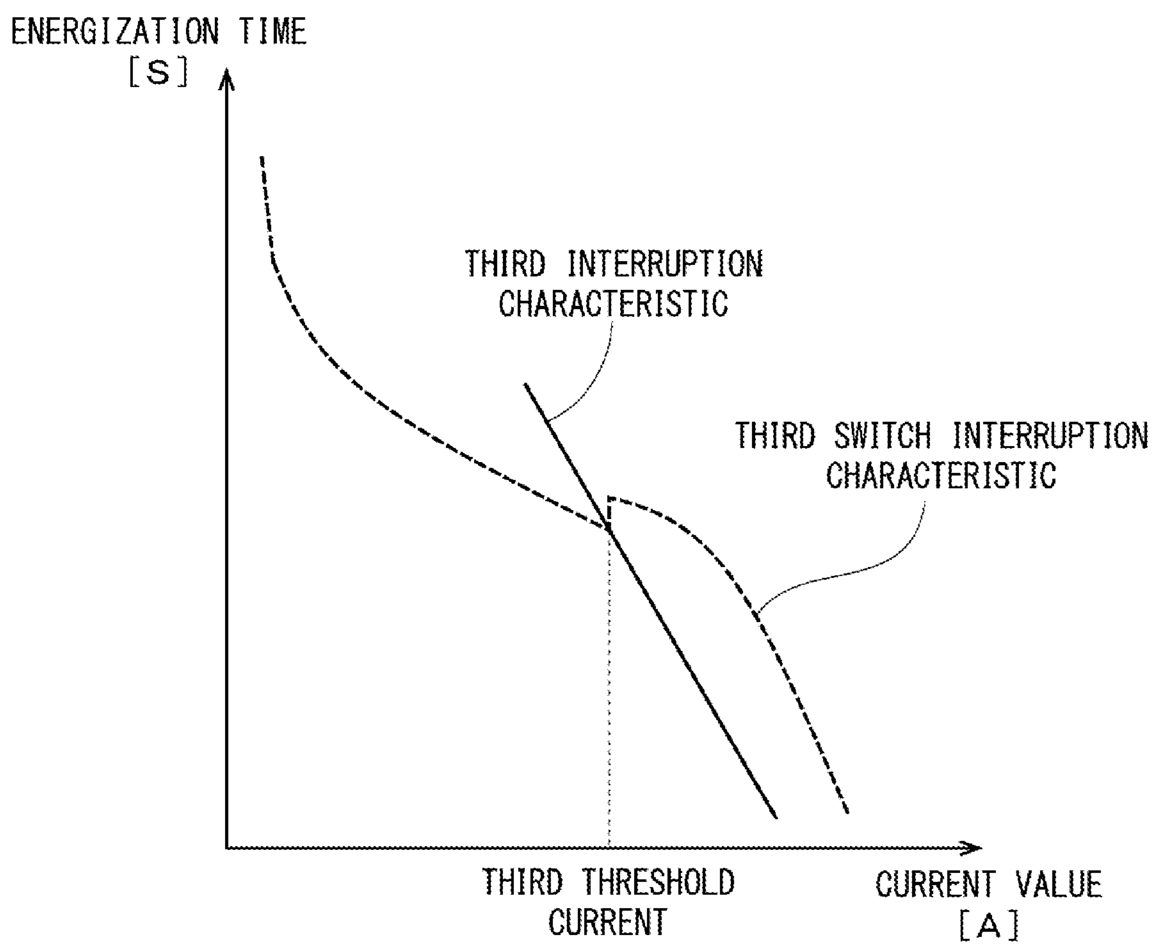
FIG. 4 is a graph illustrating a relationship between a third interruption characteristic and a third switch interruption characteristic.

As illustrated in FIGS. 2 to 4, the first interruption characteristic, the second interruption characteristic, the third interruption characteristic, the first switch interruption characteristic, the second switch interruption characteristic, and the third switch interruption characteristic are each correspondence relationship data indicating a correspondence relationship between an energization time and a current value. The correspondence relationship data is data defining how long a state exceeding a certain current value is to continue for switching to the off state. The correspondence relationship data may be an arithmetic expression such as a function, or may be a table. For example, several current values for determination are determined in advance, and every time the actual current value exceeds the current value for determination, a timer corresponding to the current value for determination is activated. Then, when the activation time of the timer reaches the energization time corresponding to the current value for determination, the state is switched to the off state. Conversely, when the actual current value falls f below the current value for determination before reaching the energization time, the timer is reset.

As illustrated in FIG. 2, to the energization time of the first interruption characteristic, a time longer than that of the first switch interruption characteristic corresponds for a current value equal to or less than the first threshold current, and a time shorter than that of the first switch interruption characteristic corresponds for a current value exceeding the first threshold current. Therefore, in the state where the first interruption condition is set, the control unit 21 switches the interruption unit 14 to the interruption state before the first switch 11 when the current value of the current flowing through the first branch path 81 exceeds the first threshold current.

As illustrated in FIG. 3, to the energization time of the second interruption characteristic, a time longer than that of the second switch interruption characteristic corresponds for a current value equal to or less than the second threshold current, and a time shorter than that of the second switch interruption characteristic corresponds for a current value exceeding the second threshold current. Therefore, in the state where the second interruption condition is set, the control unit 21 switches the interruption unit 14 to the interruption state before the second switch 12 when the current value of the current flowing through the second branch path 82 exceeds the second threshold current.

As illustrated in FIG. 4, to the energization time of the third interruption characteristic, a time longer than that of the third switch interruption characteristic corresponds for a current value equal to or less than the third threshold current, and a time shorter than that of the third switch interruption characteristic corresponds for a current value exceeding the third threshold current. Therefore, in the state where the third interruption condition is set, the control unit 21 switches the interruption unit 14 to the interruption state before the third switch 13 when the current value flowing through the third branch path 83 exceeds the third threshold current.

The ECU 20 can communicate with the external ECU 94. When determining that both the charging operation and the first discharging operation are in execution, the setting unit 22 outputs, to the external ECU 94, an abnormality signal indicating that an abnormality has occurred. When determining that the interruption condition is satisfied, the control unit 21 also outputs, to the external ECU 94, an abnormality signal indicating that an abnormality has occurred.

Figure 5:
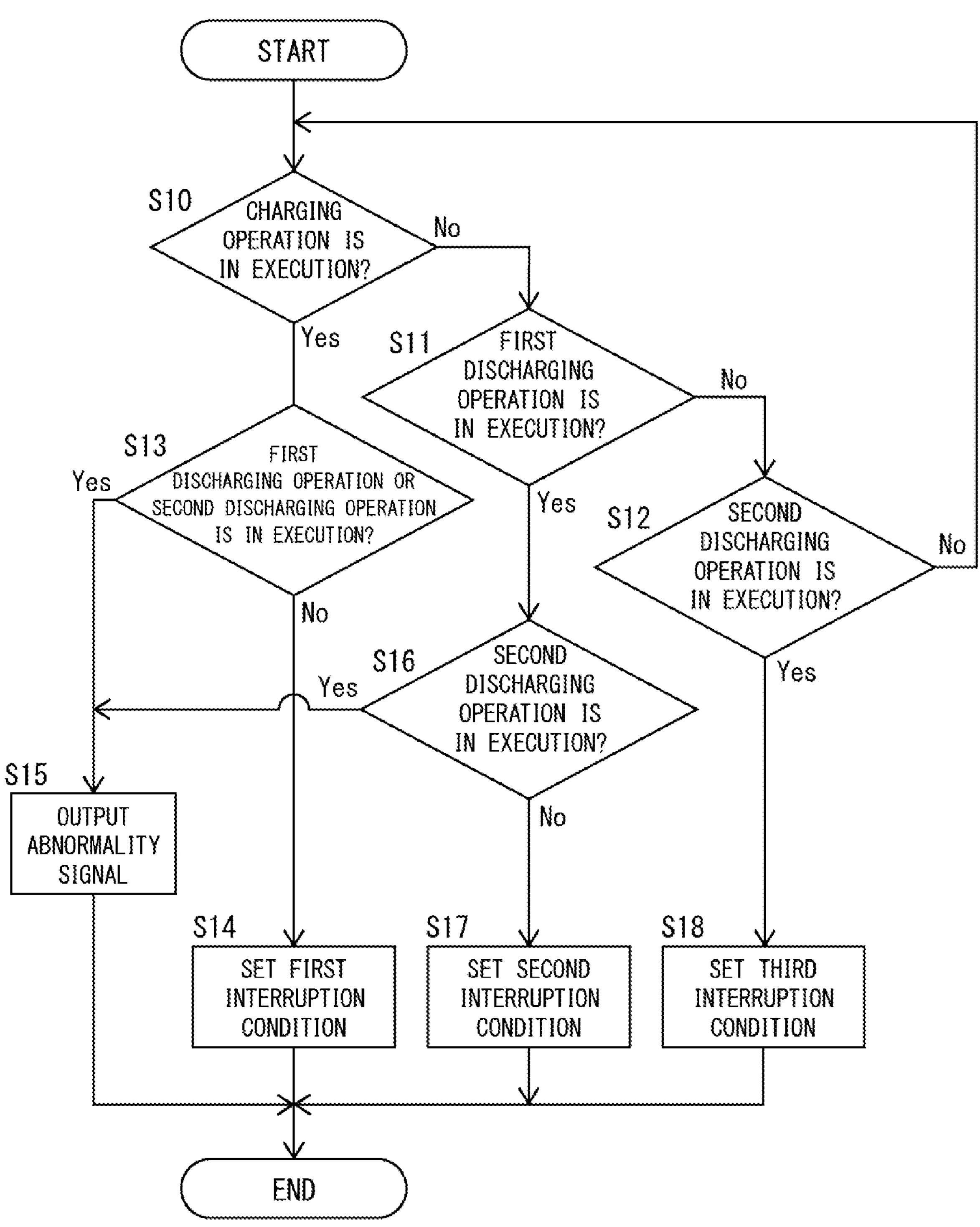
FIG. 5 is a flowchart illustrating a flow of control executed by a vehicle-mounted control device according to the first embodiment.

The setting unit 22 executes the control illustrated in FIG. 5. The control illustrated in FIG. 5 is started at the time of startup of the ECU 20, for example, and is resumed immediately after ending. At the start, the interruption unit 14 is in the allowable state. In the control illustrated in FIG. 5, first, in step S10, it is determined whether or not the charging operation is in execution. When determining that the charging operation is not in execution (in the case of No in step S10), the setting unit 22 determines whether or not the first discharging operation is in execution in step S11. When determining that the first discharging operation is not in execution (in the case of No in step S11), the setting unit 22 determines whether or not the second discharging operation is in execution in step S12. When the setting unit 22 determines that the second discharging operation is not in execution (in the case of No in step S12), the process returns to step S10. That is, the setting unit 22 repeats steps S11, S12, and S13 until any of the charging operation, the first discharging operation, and the second discharging operation is executed.

When determining that the charging operation is in execution (in the case of Yes in step S10), the setting unit 22 determines whether or not the first discharging operation or the second discharging operation is in execution in step S13. When determining that neither the first discharging operation nor the second discharging operation is in execution (in the case of No in step S13), the setting unit 22 sets the first interruption condition in step S14. When determining that the first discharging operation or the second discharging operation is in execution (in the case of Yes in step S13), the setting unit 22 outputs an abnormality signal in step S15. That is, the setting unit 22 outputs the abnormality signal when determining that the first discharging operation or the second discharging operation is in execution even though having determined that the charging operation is in execution.

When determining that the first discharging operation is in execution (in the case of Yes in step S11), the setting unit 22 determines whether or not the second discharging operation is in execution in step S16. When determining that the second discharging operation is not in execution (in the case of No in step S16), the setting unit 22 sets the second interruption condition in step S17. When determining that the second discharging operation is in execution (in the case of Yes in step S16), the setting unit 22 outputs an abnormality signal in step S15. That is, the setting unit 22 outputs the abnormality signal when determining that both the first discharging operation and the second discharging operation are in execution. When determining that the second discharging operation is in execution in step S12 (in the case of Yes in step S12), the setting unit 22 sets the third interruption condition in step S18.

The following description relates to effects of the first embodiment.

The vehicle-mounted system 100 can execute the charging operation by switching the first switch 11 to the on state, and can execute the discharging operation by switching the second switch 12 to the on state. And, the vehicle-mounted control device 1 used in this vehicle-mounted system 100 can set the interruption condition based on which operation of the charging operation and the first discharging operation is in execution. Therefore, according to this vehicle-mounted control device 1, overcurrent protection can be suitably executed both in charging and in discharging.

Furthermore, the setting unit 22 determines which operation of the charging operation and the discharging operation is in execution based on whether the first switch 11 and the second switch 12 are in the on state or in the off state.

According to this configuration, it is possible to simplify determination as to which operation of the charging operation and the discharging operation is in execution.

Furthermore, when determining that the charging operation is in execution, the setting unit 22 sets the first interruption condition for switching the interruption unit 14 to the interruption state before the first switch 11 when the current value of the current flowing through the first branch path 81 exceeds the first threshold current. Also, when determining that the first discharging operation is in execution, the setting unit 22 sets the second interruption condition for switching the interruption unit 14 to the interruption state before the second switch 12 when the current value of the current flowing through the second branch path 82 exceeds the second threshold current. The second threshold current is larger than the first threshold current.

According to this vehicle-mounted control device 1, during execution of the charging operation, the interruption unit 14 can be switched to the interruption state before the first switch 11 when the current value of the current flowing through the first branch path 81 exceeds the first threshold current. Also, during execution of the first discharging operation, the interruption unit 14 can be switched to the interruption state before the second switch 12 when the current value of the current flowing through the second branch path 82 exceeds the second threshold current. Moreover, the second threshold current is larger than the first threshold current. Therefore, it is also possible to allow the first discharging operation in which a large current flows as compared with in the charging operation. It is easy to assume the current value in the charging operation, but the current value in the first discharging operation is changeable depending on the use state. For example, in an electric vehicle or a hybrid vehicle, a high load is likely to be applied at the time of acceleration or when the vehicle ascends a slope. According to this configuration, even if a high load is applied in the first discharging operation and a current exceeding the first threshold current flows, it is possible to continuously perform the first discharging operation without switching the interruption unit 14 to the interruption state.

Furthermore, to the energization time of the first interruption characteristic, a time longer than that of the first switch interruption characteristic corresponds for a current value equal to or less than the first threshold current, and a time shorter than that of the first switch interruption characteristic corresponds for a current value exceeding the first threshold current. Also, to the energization time of the second interruption characteristic, a time longer than that of the second switch interruption characteristic corresponds for a current value equal to or less than the second threshold current, and a time shorter than that of the second switch interruption characteristic corresponds for a current value exceeding the second threshold current.

According to this configuration, during execution of the charging operation, when the current value of the current flowing through the first branch path 81 exceeds the first threshold current, the interruption unit 14 can be switched to the interruption state before the first switch 11 based on the energization time. Also, during execution of the first discharging operation, when the current value flowing through the second branch path 82 exceeds the second threshold current, the interruption unit 14 can be switched to the interruption state before the second switch 12 based on the energization time.

Furthermore, when determining that the second discharging operation is in execution, the setting unit 22 sets the third interruption condition for switching the interruption unit 14 to the interruption state before the third switch 13 when the current value flowing through the third branch path 83 exceeds the third threshold current. The third threshold current is different from the second threshold current.

According to this configuration, the interruption condition of the interruption unit 14 can be made different not only depending on whether the charging operation is in execution or the first discharging operation is in execution, but also depending on whether the first discharging operation is in execution or the second discharging operation is in execution.

Furthermore, the setting unit 22 outputs the abnormality signal when determining that both the charging operation and the first discharging operation are in execution.

According to this configuration, in a configuration where it is not assumed that both the charging operation and the first discharging operation are operated concurrently, it is possible to inform the outside about an abnormality that both the charging operation and the first discharging operation are in execution.

Second Embodiment

The second embodiment is different from the first embodiment mainly in that a specific load is connected to a common path via a temperature fuse. In the following description, the same components as those of the first embodiment are denoted by the same reference signs, and detailed description thereof will be omitted.

Figure 6:
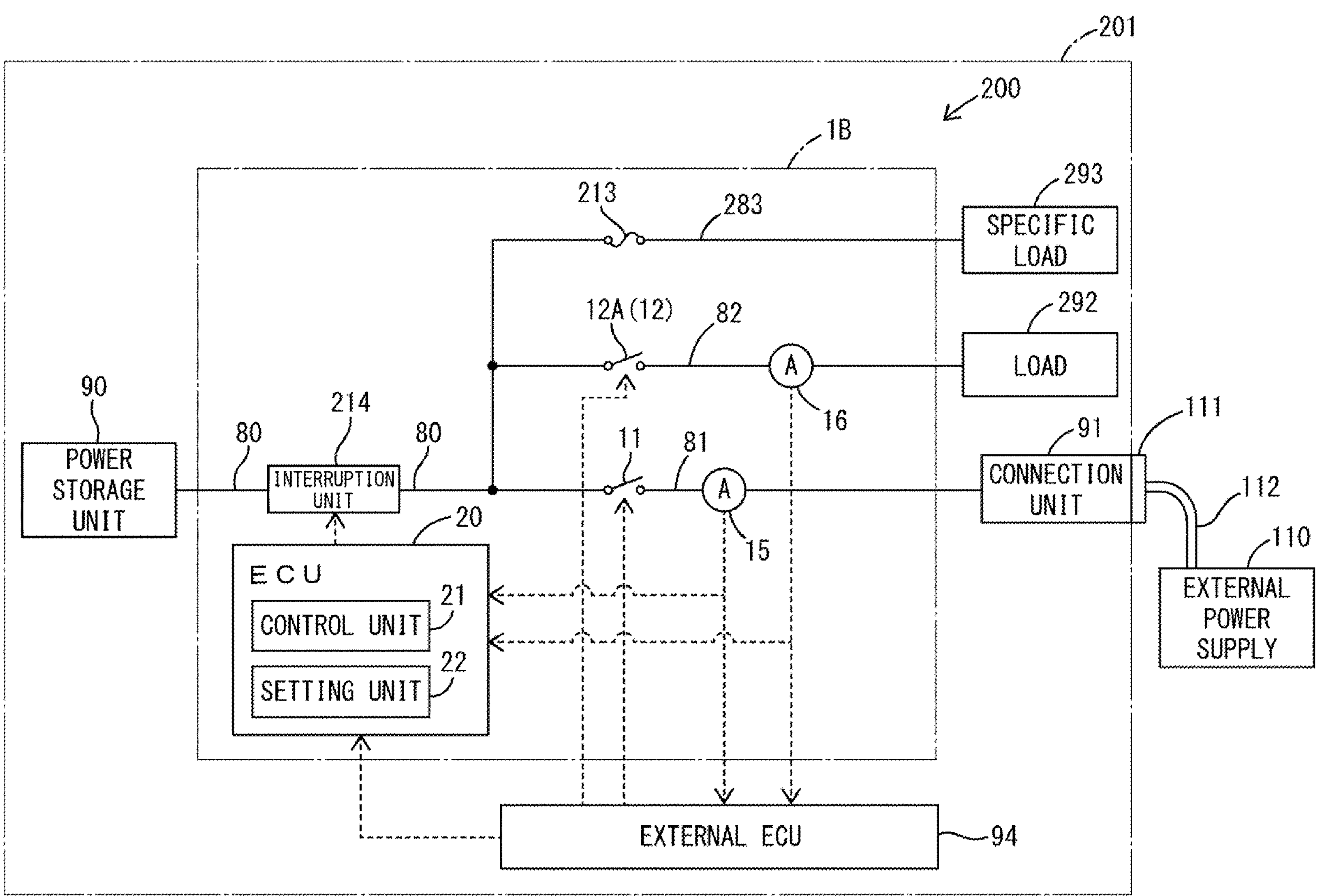
FIG. 6 is a circuit diagram schematically illustrating a configuration of a vehicle-mounted system according to a second embodiment.

A vehicle-mounted system 200 illustrated in FIG. 6 is a system mounted on a vehicle 201, and includes the power storage unit 90, the connection unit 91, a load 292, a specific load 293, the external ECU 94, the common path 80, the first branch path 81, the second branch path 82, a specific branch path 283, and a vehicle-mounted control device 1B.

The load 292 corresponds to an example of the second transfer unit. The load 292 is, for example, a motor. The motor is, for example, a traveling motor in a case where the vehicle 201 is an electric car or a hybrid car. The load 292 receives power based on the power storage unit 90 via the common path 80 and the second branch path 82.

The specific load 293 is, for example, a high-pressure auxiliary machine, more specifically, an air conditioner, a heater, or the like. The specific load 293 receives power based on the power storage unit 90 via the common path 80 and the specific branch path 283.

The common path 80 is provided between the power storage unit 90 and the plurality of transfer units (in the present embodiment, the connection unit 91, the load 292, and the specific load 293).

The second branch path 82 is provided between the power storage unit 90 and the load 292, and is electrically connected to the common path 80. The second branch path 82 is a path for guiding, to the load 292, power from the common path 80.

The specific branch path 283 is provided between the power storage unit 90 and the specific load 293, and is electrically connected to the common path 80. The specific branch path 283 is a path for guiding, to the specific load 293, power from the common path 80.

The vehicle-mounted control device 1B is a device mounted on the vehicle 201 and used in the vehicle-mounted system 200. The vehicle-mounted control device 1B includes the first switch 11, the second switch 12, a temperature fuse 213, an interruption unit 214, the current detection units 15 and 16, and the ECU 20.

The temperature fuse 213 is provided in the specific branch path 283 and is fused when exceeding a fusing temperature. When the temperature fuse 213 is fused, the flow of current between the common path 80 and the specific load 293 is interrupted.

The interruption unit 214 is provided in the common path 80. The interruption unit 214 has a function of switching from an energization state which energizes the common path 80 to an interruption state which interrupts the common path 80. In the present embodiment, the interruption unit 214 is a breaker that physically cuts the path by being given a control signal. More specifically, the interruption unit 214 is a pyrotechnic breaker (e.g., a pyrofuse (PYROFUSE®)) which causes an explosion when a driving current is input, and physically cuts the path by moving a displacement portion by this explosion. The interruption unit 214 is controlled by the ECU 20.

The ECU 20 includes a control unit 21 and a setting unit 22. The control unit 21 switches the interruption unit 214 from the allowable state to the interruption state when the interruption condition is satisfied. The setting unit 22 sets the interruption condition. The setting unit 22 can set the interruption condition based on which operation of the charging operation and the discharging operation is in execution. The charging operation is an operation of causing a charging current based on power from the connection unit 91 (i.e., the external power supply 110) to flow to the power storage unit 90 when the first switch 11 is in the on state. The discharging operation is an operation of causing a discharging current to flow from the power storage unit 90 to the load 292 when the second switch 12 is in the on state.

The charging operation and the discharging operation are executed as follows. The interruption unit 214 is normally in the allowable state, and is switched to the interruption state when an overcurrent occurs. That is, the charging operation is executed when the external power supply 110 is electrically connected to the first branch path 81 via the connection unit 91 and also the first switch 11 is switched to the on state. The discharging operation is an operation of causing a discharging current to flow from the power storage unit 90 to the load 292 when the second switch 12 is in the on state. The discharging operation is executed when the second switch 12 is switched to the on state.

The setting unit 22 determines which operation of the charging operation and the discharging operation is in execution based on whether the first switch 11 and the second switch 12 are in the on state or in the off state. The setting unit 22 can determine whether the first switch 11 and the second switch 12 are in the on state or in the off state by receiving, from the external ECU 94, a signal indicating whether the first switch 11 and the second switch 12 are in the on state or in the off state. The setting unit 22 determines that the charging operation is in execution when determining that the first switch 11 is in the on state, and determines that the discharging operation is in execution when determining that the second switch 12 is in the on state.

The interruption condition includes the first interruption condition and the second interruption condition. The setting unit 22 sets the first interruption condition when determining that the charging operation is in execution. The first interruption condition is a condition for switching the interruption unit 214 to the interruption state before the first switch 11 when the current value of the current flowing through the first branch path 81 exceeds the first threshold current. The setting unit 22 sets the second interruption condition when determining that the discharging operation is in execution. The second interruption condition is a condition for switching the interruption unit 214 to the interruption state before the second switch 12 when the current value of the current flowing through the second branch path 82 exceeds the second threshold current. The second threshold current is larger than the first threshold current.

Whether the first interruption condition is satisfied or not is determined based on the first interruption characteristic. More specifically, whether the first interruption condition is satisfied or not is determined based on the first interruption characteristic and the current value of the current flowing through the first branch path 81. Whether the second interruption condition is satisfied or not is determined based on the second interruption characteristic. More specifically, whether the second interruption condition is satisfied or not is determined based on the second interruption characteristic and the current value of the current flowing through the second branch path 82.

The first switch 11 is switched to the off state based on the first switch interruption characteristic. More specifically, the first switch 11 is switched to the off state based on the first switch interruption characteristic and the current value of the current flowing through the first branch path 81. The second switch 12 is switched to the off state based on the second switch interruption characteristic. More specifically, the second switch 12 is switched to the off state based on the second switch interruption characteristic and the current value of the current flowing through the second branch path 82.

The first interruption characteristic, the second interruption characteristic, the first switch interruption characteristic, and the second switch interruption characteristic are as described in the first embodiment.

The ECU 20 can communicate with the external ECU 94. When determining that both the charging operation and the discharging operation are in execution, the setting unit 22 outputs, to the external ECU 94, an abnormality signal indicating that an abnormality has occurred. When determining that the interruption condition is satisfied, the control unit 21 also outputs, to the external ECU 94, an abnormality signal indicating that an abnormality has occurred.

Figure 7:
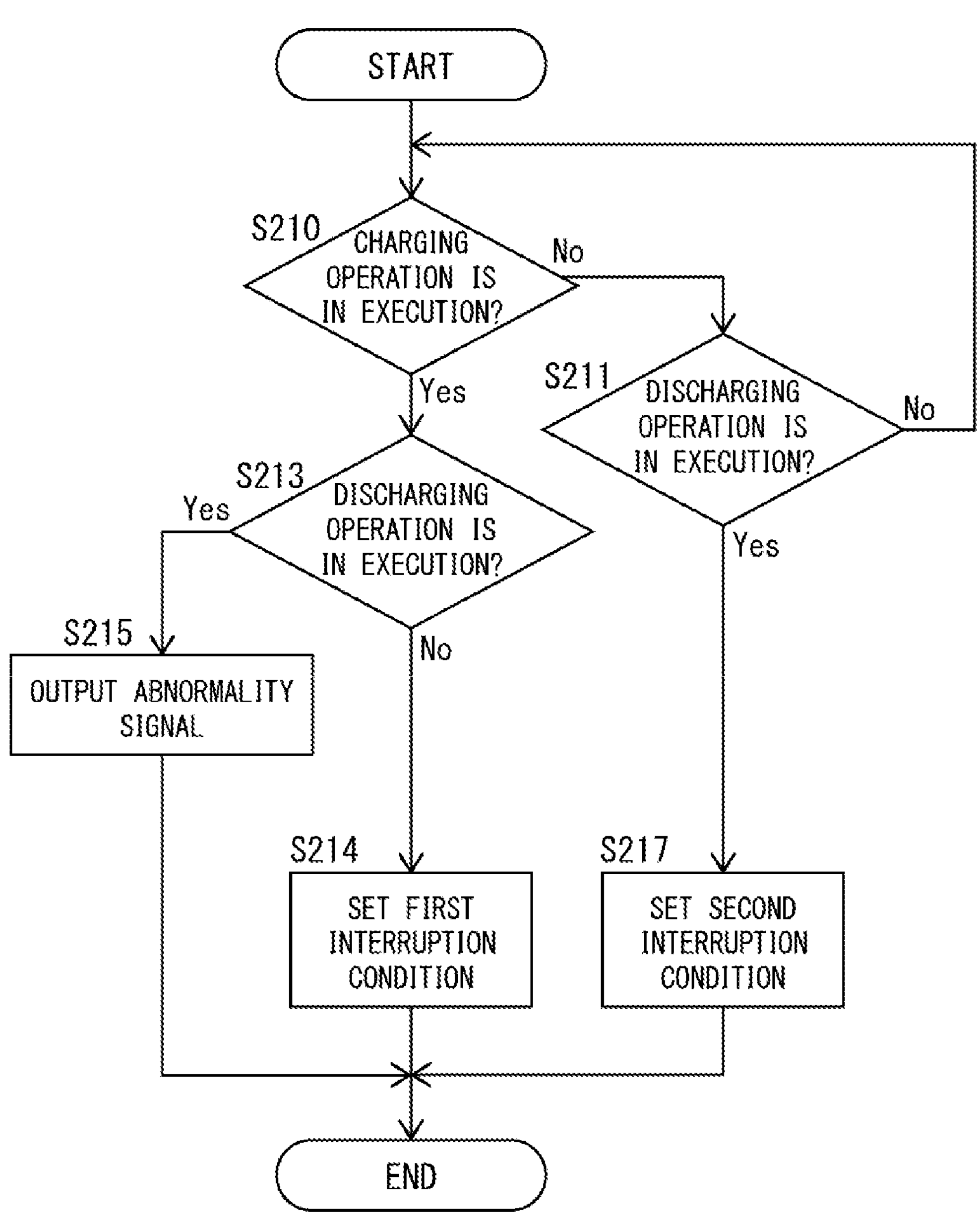
FIG. 7 is a flowchart illustrating a flow of control executed by a vehicle-mounted control device according to the second embodiment.

The setting unit 22 executes the control illustrated in FIG. 7. The control illustrated in FIG. 7 is started at the time of startup of the ECU 20, for example, and is resumed immediately after ending. At the start, the interruption unit 214 is in the allowable state. In the control illustrated in FIG. 7, first, in step S210, it is determined whether or not the charging operation is in execution. When determining that the charging operation is not in execution (in the case of No in step S210), the setting unit 22 determines whether or not the discharging operation is in execution in step S211. When the setting unit 22 determines that the discharging operation is not in execution (in the case of No in step S211), the processing returns to step S210. That is, the setting unit 22 repeats steps S211 and S212 until the charging operation or the discharging operation is executed.

When determining that the charging operation is in execution (in the case of Yes in step S210), the setting unit 22 determines whether or not the discharging operation is in execution in step S213. When determining that the discharging operation is not in execution (in the case of No in step S213), the setting unit 22 sets the first interruption condition in step S214. When determining that the first discharging operation is in execution (in the case of Yes in step S213), the setting unit 22 outputs an abnormality signal in step S215. That is, the setting unit 22 outputs the abnormality signal when determining that the discharging operation is in execution even though having determined that the charging operation is in execution.

When determining that the discharging operation is in execution (in the case of Yes in step S211), the setting unit 22 sets the second interruption condition in step S217.

The following description relates to effects of the second embodiment.

The vehicle-mounted system 200 can execute the charging operation by switching the first switch 11 to the on state, and can execute the discharging operation by switching the second switch 12 to the on state. And, the vehicle-mounted control device 1B used in this vehicle-mounted system 200 can set the interruption condition based on which operation of the charging operation and the discharging operation is in execution. Therefore, according to this vehicle-mounted control device 1B, overcurrent protection can be suitably executed both in charging and in discharging.

Furthermore, the vehicle-mounted control device 1B includes the temperature fuse 213 which is provided in the specific branch path 283 and configured to be fused when exceeding a fusing temperature. According to this configuration, when a ground fault occurs in the specific load 293, it is easy to prevent the influence of the ground fault from reaching the power storage unit 90, the connection unit 91, and the load 292.

OTHER EMBODIMENTS

The present disclosure is not limited to the embodiment described with reference to the above description and drawings. For example, the features of the embodiments described above or below can be combined in any manner within a range not contradictory. Any of the features of the embodiments described above or below can be omitted unless clearly indicated as being essential. Furthermore, the embodiment described above may be modified as follows.

In the first embodiment, as the configuration in which the ECU recognizes the on/off states of the first switch, the second switch, and the third switch, the setting unit is configured to receive a signal indicating the on/off states of the first switch, the second switch, and the third switch from the external ECU and recognize the on/off states based on this signal. However, another configuration may be adopted. For example, the control unit may be configured to control the first switch, the second switch, and the third switch so that the on/off states of the first switch, the second switch, and the third switch may be recognized based on the control state of the control unit. Alternatively, the voltage values and the current values of the first branch path, the second branch path, and the third branch path may be detected so that the on/off states of the first switch, the second switch, and the third switch may be recognized based on the detection values. A configuration in which these are combined may be adopted.

In the second embodiment, as a configuration in which the ECU recognizes the on/off states of the first switch and the second switch, the setting unit is configured to receive a signal indicating the on/off states of the first switch and the second switch from the external ECU and recognize the on/off states based on this signal. However, another configuration may be adopted. For example, the control unit may be configured to control the first switch and the second switch so that the on/off states of the first switch and the second switch may be recognized based on the control state of the control unit. Alternatively, the voltage values and the current values of the first branch path and the second branch path may be detected so that the on/off states of the first switch and the second switch may be recognized based on the detection values. A configuration in which these are combined may be adopted.

In the first embodiment, the abnormality signal is output when it is determined that the first discharging operation or the second discharging operation is in execution during execution of the charging operation. However, while the abnormality signal is output when it is determined that both the charging operation and the first discharging operation are in execution, the abnormality signal may not be output even when it is determined that both the charging operation and the second discharging operation are in execution. That is, when it is determined that the charging operation is in execution, the abnormality signal may be output only when it is determined that the first discharging operation out of the first discharging operation and the second discharging operation is executed.

In the first embodiment, the configuration where the abnormality signal is output when it is determined that both the first discharging operation and the second discharging operation are in execution, but the abnormality signal may not be output even when both the first discharging operation and the second discharging operation are in execution.

In the first embodiment, the current values flowing through the first branch path, the second branch path, and the third branch path are detected by the current detection units provided in the first branch path, the second branch path, and the third branch path, respectively. However, the current detection unit may be provided in the common path, and the current values flowing through the first branch path, the second branch path, and the third branch path may be detected based on this current detection unit. For example, the current value detected during execution of the first operation may be detected as the current value flowing through the first branch path. The current value detected during execution of the second operation may be detected as the current value flowing through the second branch path. The current value detected during execution of the third operation may be detected as the current value flowing through the third branch path. According to this configuration, the number of current detection units can be reduced.

In the second embodiment, the current values flowing through the first branch path and the second branch path are detected by the current detection units provided in the first branch path and the second branch path, respectively. However, the current detection unit may be provided in the common path, and the current values flowing through the first branch path and the second branch path may be detected based on this current detection unit. For example, the current value detected during execution of the first operation may be detected as the current value flowing through the first branch path. The current value detected during execution of the second operation may be detected as the current value flowing through the second branch path. According to this configuration, the number of current detection units can be reduced.

In each of the above embodiments, whether the interruption condition is satisfied or not is determined based on the correspondence relationship between the energization time and the current value, but may be another condition. For example, the interruption condition may be to exceed a predetermined interruption threshold. More specifically, the first interruption condition set during execution of the charging operation may be that the current value of the first branch path exceeds the first interruption threshold, and the second interruption condition set during execution of the discharging operation may be that the current value of the second branch path exceeds the second interruption threshold. The first interruption threshold may be a value larger than the second interruption threshold.

In each of the above embodiments, the example in which the first operation is the charging operation and the second operation is the discharging operation has been described, but another configuration may be adopted. For example, both the first operation and the second operation may be the discharging operation.

In each of the above embodiments, the second threshold current is larger than the first threshold current, but the second threshold current may be smaller than the first threshold current.

It should be understood that the embodiments disclosed herein are illustrative in all respects and are not restrictive. The scope of the present disclosure is not limited to the embodiments disclosed herein, and is intended to include all modifications within the scope indicated by the claims or within the scope equivalent to the claims.

The invention claimed is:

1. A vehicle-mounted control device used in a vehicle-mounted system including: a power storage unit; a plurality of transfer units that transfer power with the power storage unit; a common path provided between the power storage unit and the plurality of transfer units; a first branch path provided between a first transfer unit of the plurality of transfer units and the common path and electrically connected to the common path; a second branch path provided between a second transfer unit of the plurality of transfer units and the common path and electrically connected to the common path; a first switch provided in the first branch path; a second switch provided in the second branch path; and an interruption unit configured to switch from an allowable state which allows a flow of a current in the common path to an interruption state which interrupts a flow of a current in the common path, the vehicle-mounted control device comprising:

a control unit that switches the interruption unit from the allowable state to the interruption state when an interruption condition is satisfied; and a setting unit that sets the interruption condition, wherein the setting unit sets the interruption condition based on which operation of a first operation and a second operation is in execution, the first operation being an operation of transferring power between the power storage unit and the first transfer unit when the first switch is in an on state, the second operation being an operation of transferring power between the power storage unit and the second transfer unit when the second switch is in an on state, the setting unit sets a first interruption condition included in the interruption condition when determining that the first operation is in execution, and sets a second interruption condition included in the interruption condition when determining that the second operation is in execution, the first interruption condition is a condition for switching the interruption unit to the interruption state before the first switch is switched to an off state when a current value of a current flowing through the first branch path exceeds a first threshold current, the second interruption condition is a condition for switching the interruption unit to the interruption state before the second switch is switched to the off state when a current value of a current flowing through the second branch path exceeds a second threshold current which is different from the first threshold current, the first switch is switched to an off state based on a first switch interruption characteristic, the second switch is switched to an off state based on a second switch interruption characteristic, whether the first interruption condition is satisfied or not is determined based on a first interruption characteristic, whether the second interruption condition is satisfied or not is determined based on a second interruption characteristic, the first switch interruption characteristic, the second switch interruption characteristic, the first interruption characteristic, and the second interruption characteristic are each defined by correspondence relationship data indicating a correspondence relationship between an energization time and a current value, to the energization time of the first interruption characteristic, a time longer than that of the first switch interruption characteristic corresponds for a current value equal to or less than the first threshold current, and a time shorter than that of the first switch interruption characteristic corresponds for a current value exceeding the first threshold current, and to the energization time of the second interruption characteristic, a time longer than that of the second switch interruption characteristic corresponds for a current value equal to or less than the second threshold current, and a time shorter than that of the second switch interruption characteristic corresponds for a current value exceeding the second threshold current.

2. The vehicle-mounted control device according to claim 1, wherein the setting unit determines which of the first operation and the second operation is in execution based on whether the first switch and the second switch are in an on state or an off state.

3. The vehicle-mounted control device according to claim 1, wherein the first transfer unit is a connection unit connected to an external power supply via a charging cable, the second transfer unit is a load, the common path is a discharging path from the power storage unit and also is a charging path to the power storage unit, the first branch path is a path for guiding, to the common path, power supplied via the connection unit, the second branch path is a path for guiding, to the load, power from the common path, and the setting unit sets the interruption condition based on which operation of a charging operation and a discharging operation is in execution, the charging operation being an operation of causing a charging current supplied via the connection unit to flow to the power storage unit when the first switch is in an on state, the discharging operation being an operation of causing a discharging current to flow from the power storage unit to the load when the second switch is in an on state.

4. The vehicle-mounted control device according to claim 3, wherein the second threshold current is larger than the first threshold current.

5. The vehicle-mounted control device according to claim 4, wherein the vehicle-mounted system includes a third branch path provided between a third transfer unit of the plurality of transfer units and the common path and electrically connected to the common path, and a third switch provided in the third branch path, the third transfer unit is a second load, when the third switch is in an on state, a second discharging operation of causing a discharging current to flow from the power storage unit to the second load is performed, the setting unit sets a third interruption condition included in the interruption condition when determining that the second discharging operation is in execution, the third interruption condition is a condition for switching the interruption unit to the interruption state before the third switch is switched to an off state when a current value flowing through the third branch path exceeds a third threshold current, and the third threshold current is different from the second threshold current.

6. The vehicle-mounted control device according to claim 5, wherein the setting unit outputs an abnormality signal when determining that both the charging operation and the discharging operation are in execution.

7. The vehicle-mounted control device according to claim 6, wherein the vehicle-mounted system includes a specific load that is different from the transfer unit and receives power from the power storage unit, and a specific branch path that is provided between the specific load and the common path and is electrically connected to the common path, and the vehicle-mounted control device further includes a temperature fuse that is provided in the specific branch path and configured to be fused when exceeding a fusing temperature.

8. A vehicle-mounted control device used in a vehicle-mounted system including: a power storage unit; a plurality of transfer units that transfer power with the power storage unit; a common path provided between the power storage unit and the plurality of transfer units; a first branch path provided between a first transfer unit of the plurality of transfer units and the common path and electrically connected to the common path; a second branch path provided between a second transfer unit of the plurality of transfer units and the common path and electrically connected to the common path; a first switch provided in the first branch path; a second switch provided in the second branch path; and an interruption unit configured to switch from an allowable state which allows a flow of a current in the common path to an interruption state which interrupts a flow of a current in the common path, the vehicle-mounted control device comprising:

a control unit that switches the interruption unit from the allowable state to the interruption state when an interruption condition is satisfied; and a setting unit that sets the interruption condition, wherein the setting unit sets the interruption condition based on which operation of a first operation and a second operation is in execution, the first operation being an operation of transferring power between the power storage unit and the first transfer unit when the first switch is in an on state, the second operation being an operation of transferring power between the power storage unit and the second transfer unit when the second switch is in an on state, the first transfer unit is a connection unit connected to an external power supply via a charging cable, the second transfer unit is a load, the common path is a discharging path from the power storage unit and also is a charging path to the power storage unit, the first branch path is a path for guiding, to the common path, power supplied via the connection unit, the second branch path is a path for guiding, to the load, power from the common path, and the setting unit sets the interruption condition based on which operation of a charging operation and a discharging operation is in execution, the charging operation being an operation of causing a charging current supplied via the connection unit to flow to the power storage unit when the first switch is in an on state, the discharging operation being an operation of causing a discharging current to flow from the power storage unit to the load when the second switch is in an on state, the setting unit sets a first interruption condition included in the interruption condition when determining that the charging operation is in execution, and sets a second interruption condition included in the interruption condition when determining that the discharging operation is in execution, the first interruption condition is a condition for switching the interruption unit to the interruption state before the first switch is switched to an off state when a current value of a current flowing through the first branch path exceeds a first threshold current, the second interruption condition is a condition for switching the interruption unit to the interruption state before the second switch is switched to an off state when a current value of a current flowing through the second branch path exceeds a second threshold current, the second threshold current is larger than the first threshold current, the vehicle-mounted system includes a third branch path provided between a third transfer unit of the plurality of transfer units and the common path and electrically connected to the common path, and a third switch provided in the third branch path, the third transfer unit is a second load, when the third switch is in an on state, a second discharging operation of causing a discharging current to flow from the power storage unit to the second load is performed, the setting unit sets a third interruption condition included in the interruption condition when determining that the second discharging operation is in execution, the third interruption condition is a condition for switching the interruption unit to the interruption state before the third switch is switched to an off state when a current value flowing through the third branch path exceeds a third threshold current, and the third threshold current is different from the second threshold current.

9. The vehicle-mounted control device according to claim 2, wherein the first transfer unit is a connection unit connected to an external power supply via a charging cable, the second transfer unit is a load, the common path is a discharging path from the power storage unit and also is a charging path to the power storage unit, the first branch path is a path for guiding, to the common path, power supplied via the connection unit, the second branch path is a path for guiding, to the load, power from the common path, and the setting unit sets the interruption condition based on which operation of a charging operation and a discharging operation is in execution, the charging operation being an operation of causing a charging current supplied via the connection unit to flow to the power storage unit when the first switch is in an on state, the discharging operation being an operation of causing a discharging current to flow from the power storage unit to the load when the second switch is in an on state.

10. The vehicle-mounted control device according to claim 2, wherein the vehicle-mounted system includes a specific load that is different from the transfer unit and receives power from the power storage unit, and a specific branch path that is provided between the specific load and the common path and is electrically connected to the common path, and the vehicle-mounted control device further includes a temperature fuse that is provided in the specific branch path and configured to be fused when exceeding a fusing temperature.

* * * * *